(12) United States Patent
Cheng

(10) Patent No.: US 6,600,724 B1
(45) Date of Patent: Jul. 29, 2003

(54) ROUTING TABLE STRUCTURES

(75) Inventor: Dean Cheng, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/069,069

(22) Filed: Apr. 28, 1998

(51) Int. Cl.[7] .............................................. H04L 12/28
(52) U.S. Cl. .................................. 370/256; 370/395.31
(58) Field of Search ................................ 370/216, 221, 370/225, 229, 230–5, 236–8, 395, 400–2, 248, 241, 243, 246, 252, 254, 255, 256, 295.1, 295.2, 395.21, 395.31, 395.32, 395.6

(56) References Cited

U.S. PATENT DOCUMENTS

| | | | |
|---|---|---|---|
| 4,466,060 A | | 8/1984 | Riddle |
| 4,905,233 A | * | 2/1990 | Cain et al. .................. 370/237 |
| 5,115,495 A | * | 5/1992 | Tsuchiya et al. ............ 709/239 |
| 5,253,248 A | * | 10/1993 | Dravida et al. ............. 370/228 |
| 5,274,643 A | | 12/1993 | Fisk |
| 5,313,454 A | | 5/1994 | Bustini |
| 5,317,562 A | | 5/1994 | Nardin et al. |
| 5,649,108 A | * | 7/1997 | Spiegel et al. .............. 370/400 |
| 5,805,593 A | * | 9/1998 | Busche ....................... 370/238 |
| 5,844,887 A | | 12/1998 | Oren et al. |
| 5,903,559 A | | 5/1999 | Acharya et al. |
| 5,948,069 A | | 9/1999 | Kitai et al. |
| 5,991,272 A | | 11/1999 | Key et al. |
| 5,991,295 A | | 11/1999 | Tout et al. |
| 5,995,503 A | | 11/1999 | Crawley et al. |
| 6,026,077 A | | 2/2000 | Iwata |
| 6,041,059 A | | 3/2000 | Joffe et al. |
| 6,067,298 A | | 5/2000 | Shinohara |
| 6,094,687 A | | 7/2000 | Drake, Jr. et al. |
| 6,097,722 A | | 8/2000 | Graham et al. |
| 6,104,701 A | * | 8/2000 | Avargues et al. ........... 370/238 |
| 6,122,272 A | | 9/2000 | Tomaszewski et al. |
| 6,141,325 A | | 10/2000 | Gerstel |
| 6,144,661 A | | 11/2000 | Katsube et al. |
| 6,201,810 B1 | | 3/2001 | Masuda et al. |
| 6,202,082 B1 | | 3/2001 | Tomizawa et al. |
| 6,256,309 B1 | | 7/2001 | Daley et al. |
| 6,304,549 B1 | | 10/2001 | Srinivasan et al. |
| 6,529,498 B1 | | 3/2003 | Cheng |

OTHER PUBLICATIONS

Stevens, Richard, W., "TCP/IP Illustrated," Addison Wesley, vol. 1, pp. 127–141 (1994).

Stallings, William, "ISDN and Broadband ISDN with Frame Relay and ATM," p. 463, (1989).

(List continued on next page.)

*Primary Examiner*—David Vincent
(74) *Attorney, Agent, or Firm*—Blakely, Sokoloff, Taylor & Zafman LLP

(57) ABSTRACT

A routing table structure for ATM or other networks comprises a shortest path tree architected and organized as a pseudo-spanning tree. The pseudo-spanning tree is a graphical representation of computed routes within the network, optimized to a specified constraint for a specified network service category, and allows for rapid compilation of one or more source-computed routes (e.g., DTLs in an ATM network) by traversing from a destination node specified in a call request to the calculating node (i.e., the node at which the request is received). Unlike conventional spanning trees, however, the pseudo-spanning tree representation may include alternate routes between network nodes. By providing these alternate routes in a single routing table structure, the present invention may utilize less storage and processing resources as compared to routing table schemes of the past. Further, in addition to the single optimization criterion, the routing table structure includes other network traffic parameters for associated links and nodes of the network.

50 Claims, 5 Drawing Sheets

OTHER PUBLICATIONS

"Traffic Management Specification v4.0," The ATM Forum Technical Committee (Apr. 1996).

"Addendum to Traffic Management v4.0 for ABR Parameter Negotiation," The ATM Forum Technical Committee (Jan. 1997).

The ATM Forum Technical Committee, "Integrated Local Management Interface (ILMI) Specification, Version 4.0," ATM Forum document number af–ilmi–0065.000, Sep. 1996.

The ATM Forum Technical Committee, "ATM User–Network Interface (UNI) Signalling Specification, Version 4.0," ATM Forum document number af–sig–0061.000, Jul. 1996.

"Addendum to UNI Signalling v4.0 for ABR Parameter Negotiation," The ATM Forum Technical Committee (Jan. 1997).

The ATM Forum, "ATM User–Network Interface, Version 3.1 (UNI 3.1) Specification," Draft of May 28, 1994.

The ATM Forum Technical Committee, "Private–Network Interface Specification Version 1.0 Addendum (Soft PVC MIB)," ATM Forum document number af–pnni–0066.000, Sep. 1996.

The ATM Forum Technical Committee, "Private–Network–Network Interface Specification Version 1.0 (PNNI 1.0)," ATM Forum document number af–pnni–0055.000, Mar. 1996.

Radia Perlman, "Interconnection: Bridges and Routers," Addison–Wesley, pp. 230–231, 1992.

Sedgewick, R., "Algorithms in C++," Addison–Wesley, pp. 454–458, 1992.

Turner, J.S., "New Directions in Communications (or Which Way to the Information Age?)," IEEE Communications Magazine, vol. 24, No. 10, Oct. 1995.

Dickie, M., "Routing in Today's Internetworks," Van Nostrand Rheinhold, pp. 73–74, 1994.

Moy, J., "Multicast Extensions to OSPF," Network Working Group, RFC 1584, Mar. 1994.

The ATM Forum, "ATM User–Network Interface Specification Version 3.1," Sep. 1994.

R. Callon, R. Coltun, J. Drake, J. Feffords, G. Swallow,"A Strawman Proposal for the ATM PINNI Routing Hierarchy," ATM Forum 94–0073, Jan. 1994.

K. Sivarajan, W. Lee, "Issues in the Aggregation of Link State Parameters in Hierarchical PINNI Networks," ATM Forum 94–0646, Jul. 18–24, 1994.

Whay Lee, "A Minimal Spanning Connectivity Method for Link State Aggregation," ATM Forum 94–0673. Jul. 1994.

Ethan A. Speigel, "Representation of Node Parameters Using Exceptions," ATM Forum 94–0907, Sep. 26–29, 1994.

Whay C. Lee, "Some Guidelines for P–NNI Topology Aggregation," ATM Forum 95–0153, Feb. 1995.

Rauf Izmailov et al., "Aggregation of Administrative Weight," ATM Forum 96–0818, Jun. 1995.

The ATM Forum, "ATM Forum 94–0471R16: PNNI Draft Specification (PNNI SWG)," Feb. 1996.

Khalid Ahmad and Todd Morris, "Clarification on use of VPC and Bandwidth Handling for the B–ICI," ATM Forum 94–0676, Jul. 18, 1994.

George C. Sackett and Christopher Y Metz, ATM and Multiprotocol Networking, McGraw–Hill, Chapter 10, pp. 215–228, 1997.

Uyless Black, "ATM Foundation for Broadband Networks," Prentice Hall PTR, pp. 141–142, 208–214, 223–229, 241, 248–249, 1995.

Anthony Alles, "ATM Internetworking", pp. 1–58, (5/95).

Whay C. Lee, Michael G. Hluchyi and Pierre A. Humblet, "Routing Subject to Quality of Service Constraints in Integrated Communication Networks", *IEEE Network*, pp. 46–55 (Jul./Aug. 1995).

ATM Forum 94–0471R12, *Appendix H: Route Generation Algorithm*, pp. 256–263.

ATM–Forum__95–0099, "A Sample Algorithm for Route Generation", ATM Forum Technical Committee PNNI Subworking Group, pp. 1–7 (Jan. 26, 1995).

* cited by examiner

A SHORTEST PATH TREE ORGANIZED AS A PSEUDO-SPANNING TREE

ROUTING TABLE STRUCTURES

FIELD OF THE INVENTION

The present invention is related to architectures and related structures used for computer network routing tables and, in particular, for PNNI routing tables used in ATM networks.

BACKGROUND

Asynchronous Transfer Mode (ATM) is a connection oriented system. As such, connection requests need to be routed from a requesting node though the ATM network to a destination node. The ATM Forum has defined a private network-to-network or node-to-node interface (PNNI) protocol which allows easier interconnection of ATM switches. The PNNI protocol consists of two components. The first is a signaling protocol used to relay ATM connection requests within a network between a source and a destination. The second is a routing protocol used to determine the path for routing signaling requests though the ATM network. The goal of the PNNI protocol is to advertise enough information between the nodes of a network so as to allow the nodes to route call requests within the network. Ideally, every ATM switch in a network would not only know the address of every ATM attached installation but also the current available composite (VPI/VCI) for new switched virtual circuits (SVCs) to every switch. However, as ATM networks grow to include hundreds or even thousands of switches supporting tens of thousands of users and devices, such an implementation becomes unfeasible.

Nevertheless, finding the shortest or best available path from one point to another across an ATM network does require that each node know something about what the network looks like. For example, each node must know its own whereabouts in the network and be able to locate other nodes or ATM installations so that it can establish virtual circuits offering the appropriate speed and quality of service (QoS) parameters. The solution devised by the ATM Forum is a scheme that distributes and summarizes network topologies so that nodes have detailed information about their local topology and summarized information about more distant regions of the network. The PNNI protocol manages this information through the use of an hierarchical topology, along with an addressing scheme similar to that used in telephony networks.

For each node (e.g., switch) of an ATM network, a PNNI interface associates a connection between two nodes and the connection may be a physical link or a virtual path connection (VPC). In general, every PNNI-capable node has several such interfaces and each is associated with a set of parameter (usually stored in a data structure in memory), including a traffic metrics table that stores the available traffic resource parameters on the link associated with the interface (in the forward direction). These traffic metric's tables are generally two-dimensional and associate service classes with the type of traffic metrics or attributes supported by the connection. In one sense, PNNI is a link state algorithm and QoS-based routing protocol which can collect and advertise these link state parameters (i.e., the attributes and metrics that are associated with each link and node) which become the bases for routing path selections within the network.

Using PNNI, then network nodes are provided with "reachability information" (i.e., based on the traffic metrics and attributes) about other nodes. This reachability information is used by a source node to construct a designated transit list (DTL) that describes a complete route to a destination node. The DTL is inserted into a signaling request which is then transmitted along the path described by the DTL. Thus, using PNNI, a single connection will be set up between the source node and the destination node.

ATM nodes configured to use the PNNI routing protocol advertise the reachability of a particular ATM address over multiple ATM physical links. The various levels of the switching hierarchy established by PNNI, map different segments of the overall ATM network in different degrees of detail. By breaking a large network of ATM switches into smaller domains called peer groups, PNNI allows individual switches to navigate paths through the entire network without requiring them to store an entire map of the network in memory. PNNI organizes nodes into peer groups and nodes within a peer group elect a leader node called a peer group leader. The peer group leader summarizes information about the peer group and presents that information to the next higher level hierarchy and also instantiates a logical group node (LGN) at the next higher level. The LGN represents its own child peer group at the lower level and becomes the peer of other LGNs at its level.

Using PNNI then, nodes in an ATM network automatically form a hierarchy of peer groups according to addresses assigned by a network manager. The nodes' ATM addresses provide the key to the structure of this hierarchy. Each peer group has its own identifier (called a peer group ID), similar to a telephone exchange or area code. For a lower level peer group this ID is similar to an area code and exchange. For a higher peer group, it would be similar to just the area code. Finally, each node within a peer group has a unique address, similar to the way each line in a telephone exchange has a unique number.

Once the PNNI hierarchy is created, peer group leaders are allocated, and routing information is exchanged. Thereafter, the ATM nodes can begin to establish SVCs between various end-stations on the network. Using the PNNI protocol, installations on remote networks can easily establish SVCs across the hierarchy with other end stations and different peer groups.

When a signaling request is received across a user-to-network interface (UNI) by a ingress node, the node will use a shortest path algorithm, such as a Dijkstra calculation, to determine a path to connect the call to the desired destination. This calculation will create a set of DTLs, and each node will have: a full, detailed path within the source node's own peer group; a less detailed path within the parent peer groups; and even less detail on higher level peer groups, terminating in the lowest level peer group which is an ancestor of both the source and the destination nodes. Hence, using PNNI, SVCs can be set up across a network. Once the connection is established, ATM cells are forwarded by simple table lookups, e.g., using connection tables.

As indicated above, the PNNI specification requires that QoS sensitive source routing algorithms be used in the PNNI hierarchical routing environment. QoS sensitive routing implies that the route selection algorithm must determine whether a source route can support all of the QoS requirements of a request. This requires that the routing algorithm consider both link constraints and path constraints. Link constraints such as available bandwidth (AvCR) are relatively easy to deal with because links which do not meet a caller's requirements may simply be dropped or pruned from the topology during the shortest path calculation. However, path constraints such as cell transfer delay (CTD) and cell delay variation (CDV) are more difficult to deal with because they are not dependent on a single link only and, to date, no known routing algorithm is capable of optimizing for multiple path constraints.

Of the known routing algorithms (or shortest path algorithms), on-demand routing has gained some popularity. Indeed, one method of on-demand routing is presented as an appendix to the ATM Forum's PNNI specification. In general, on-demand routing performs a separate route computation for each requested route. On-demand routing according to this method optimizes on a single path constraint while pruning links that do not meet the caller's requirements.

Another routing scheme proposed in the PNNI specification uses pre-computed routes. In this case, sets of paths for each QoS (e.g., constant bit rate (CBR), real-time variable bit rate (rtVBR), non-real-time variable bit rate (nrtVBR), available bit rate (ABR) and unspecified bit rate (UBR)) are pre-calculated by computing the shortest path routes using a single optimization criteria for a single class of service. The routes provided are optimized without considering bandwidth (i.e., so long as a link has >0 bandwidth it is used for the shortest path computation) and the method falls back to on-demand routing every time the search of pre-computed routes fails. In general, the pre-computed routes are stored in linear routing tables. The number of pre-calculated routing tables depends on the number of combinations of QoS-based link state parameters that a node generates and receives from the network. Each routing table is maintained as a shortest path tree (SPT), and each SPT is constructed based on the optimization of a single traffic metric. In other words, each SPT maintains a shortest path tree to each reachable destination node in the same PNNI routing domain based on a single criterion, i.e., a traffic metric.

The use of such conventional routing tables, however, has several undesirable effects. For example, because the shortest path information is maintained as a linear table, and because usually multiple such tables are required to accommodate all of the various traffic metrics and service classes, a considerable amount of memory is required just to store the tables. Indeed, where all service classes exist in a network, a maximum number of these tables may have to be generated and stored. Further, because known routing algorithms can only optimize on a single constraint at a time, this suggests that any SPT made up of traditional routing tables will contain only those paths optimized for the designated traffic parameter. Yet, other parameters (which were not the subject of the route optimization computation) may also be determinative of whether a given route may be used by a connection request.

What is desired, therefore, is a routing table structure for ATM or other networks that avoids the drawbacks of prior schemes.

SUMMARY OF THE INVENTION

The present invention provides an improved routing table structure for ATM or other networks which, in one embodiment, comprises a shortest path tree architected and organized as a pseudo-spanning tree. The pseudo-spanning tree is a graphical representation of computed routes within the network, optimized to a specified constraint for a specified network service category, and allows for rapid compilation of one or more source-computed routes (e.g., DTLs in an ATM network) by traversing from a destination node specified in a call request to the calculating node (i.e., the node at which the request is received). Unlike conventional spanning trees, however, the pseudo-spanning tree representation may include alternate routes between network nodes. By providing these alternate routes in a single routing table structure, the present invention may utilize less storage and processing resources as compared to routing table schemes of the past. Further, in addition to the single optimization criterion, the routing table structure includes other network traffic parameters for associated links and nodes of the network.

In a further embodiment, the present invention provides a computer-generated shortest path tree which includes a graphical representation of one or more inter-nodal paths in a computer network, optimized to a specified constraints. In general, the constraints may be an ATM traffic parameter, for example a delay-based constraints or a cost-based constraints. The graphical representation may comprise a tree structure, made up of root node (i.e., the node which generated the tree), one or more branch nodes and/or one or more leaf nodes. The leaf nodes are characterized as having at least one parent node, which may be a branch node or the root node, and no child nodes. The branch nodes are characterized by having at least one parent node, which may be another branch node or the root node, and at least one child node, which may be another branch node or a leaf node. The root node is characterized by not having any parent nodes. The various nodes of the tree are connected by one or more links of the computer network. Where a child node has two or more parent nodes in the graphical representation, this is an indication that two equal cost paths exist within the computer network to reach the node represented by that child root.

In yet a further embodiment, the present invention provides a method which includes generating a shortest path tree as a graphical representation of one or more inter-nodal paths in a computer network, optimized to a specified constraints (e.g., an ATM traffic parameter). Prior to generating the shortest path tree, the constraints may be selected, and the constraint may be a delay- or cost-based constraint (e.g., the relative desirability of using a link within the computer network). Further, in response to a connection request, one of the paths may be selected, for example by tracing the inter-nodal paths from a destination node identified in the request to a local node. The destination node may be selected using an index pointer from a table accessed using the information from the request.

These and other features and advantages provided by the present invention will become apparent from a review of the detailed description and its accompanying drawings which follow.

BRIEF DESCRIPTION OF THE DRAWINGS

The present invention is illustrated by way of example, and not limitation, in the figures of the accompanying drawings in which.

DETAILED DESCRIPTION

Described herein are routing table structures which may find application as routing tables for ATM or other computer networks. In general, the routing table structures provide a selection of pre-computed routes optimized to a specified constraint such as delay and delay variation (e.g., as measured by CTD and CDV), or administrative weight (AW). In one exemplary embodiment, the routing table structure is implemented as a shortest path tree, e.g., as may be generated by a Dijkstra process, organized as a pseudo-spanning tree. The pseudo-spanning tree is a graphical representation of the computed routes within the network, optimized to a specified constraint for a specified network service category, and allows for rapid compilation of one or more source-computed routes (e.g., DTLs in an ATM network) by traversing from a destination node specified in a call request to the calculating node (i.e., the node at which the request is received). Unlike conventional spanning trees, however, the pseudo-spanning tree representation may include alternate routes between network nodes. By providing these alternate routes in a single routing table structure, the present invention may utilize less storage and processing resources as compared to routing table schemes of the past. Further, in addition to the single optimization criterion, the routing table structure includes other network traffic parameters for associated links and nodes of the network.

Figure 1:
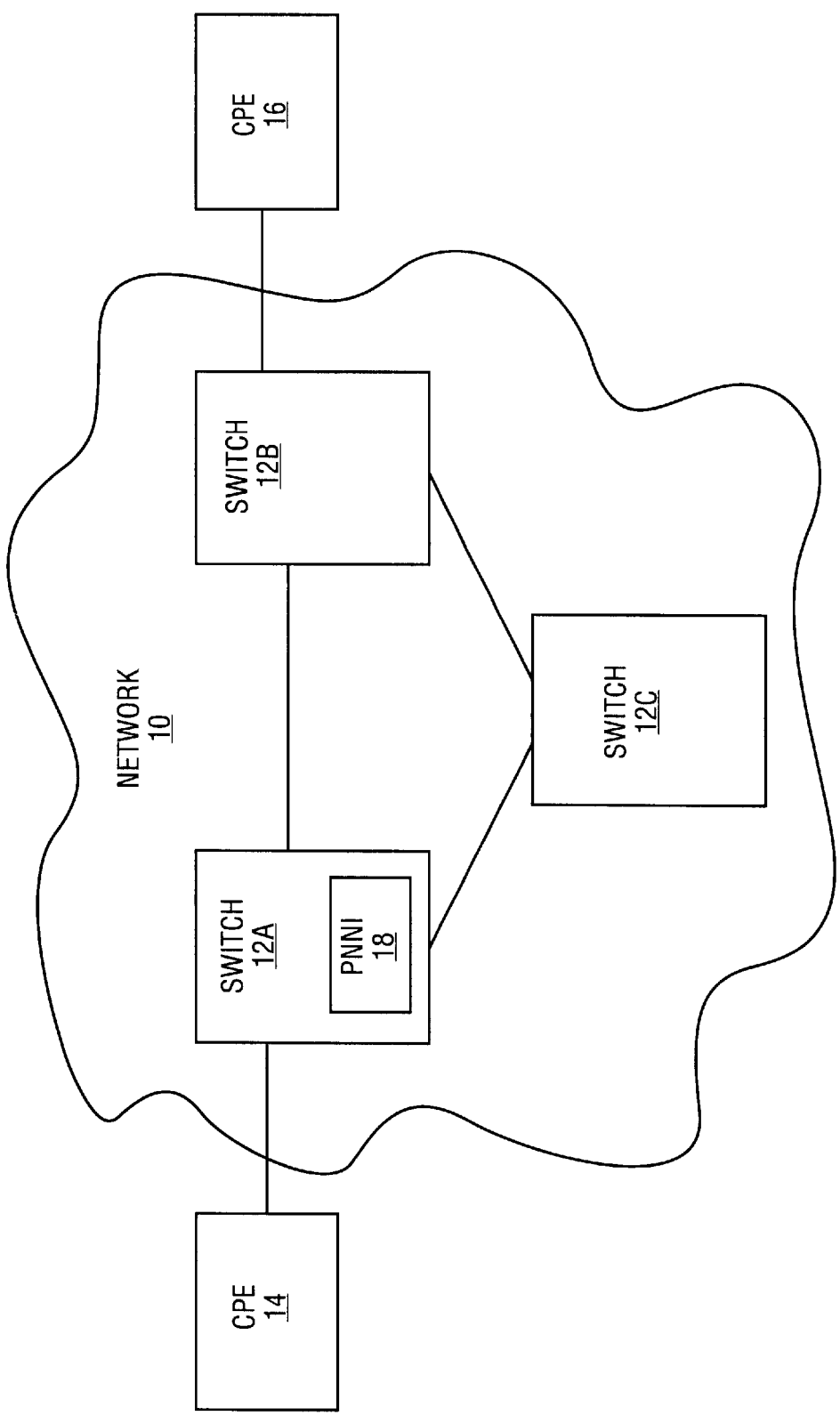
FIG. 1 illustrates an ATM network configured with a routing table structure in accordance with one embodiment of the present invention.

An exemplary call establishment procedure which makes use of the present routing table structure is shown in FIG. 1. Network 10 is made up of three switches 12a, 12b and 12c. Of course, this is merely an example and, in practice, a network such as an ATM or other cell or packet switched network will be made up of a number of switches. Assume a user at customer premises equipment (CPE) 14 wishes to establish a connection with CPE 16. For example, a remote user at CPE 14 may wish to access a server at CPE 16. A call setup message from CPE 14 is delivered to switch 12a using a switched virtual circuit (SVC). When the signaling request is received, switch 12a will use PNNI routing agent 18 to determine whether a path through network 10 which meets the call request parameters (e.g., QoS; bandwidth, etc.) can be established. If no route can be found, then the call is blocked (cleared). If a path is found, a DTL is created for downstream nodes to follow and forwarded along the route.

To determine whether a path exists that will satisfy the call request, the PNNI routing agent 18 uses pre-computed routing tables (called shortest path trees or SPTs) stored in memory at switch 12a to determine whether such a route can be established. The SPTs are pre-computed using a shortest path algorithm, such as a Dijkstra calculation, to determine a path to CPE 16. This calculation will create a set of DTLs, with at least one DTL to each other network switching node that is reachable from switch 12a (i.e., the local switch). Hence, using the pre-computed quality of service sensitive routes, SVCs can be set up across network 10 to connect CPE 14 to CPE 16. Once the connection is established, ATM cells are exchanged between the source and destination.

PNNI routing agent 18 is a relatively independent process within switch 12a and its main function is to create a routing database to be used by a connection manager within switch 12a for SVC connection requests. The routing agent 18 thus provides an interface between the PNNI protocol and the connection manager. As indicated above, when the routing agent 18 is invoked for a route request, it searches pre-calculated routing databases for the given destination along with the requested service class and traffic metric parameters. If there exists a satisfactory route, the associated DTL is returned as a response. If for some reason a downstream node rejects the call request (crankback), then the routing agent 18 of the source node provides an alternate route, if any, that does not include the cranked back node(s) and/or link(s).

Figure 2:
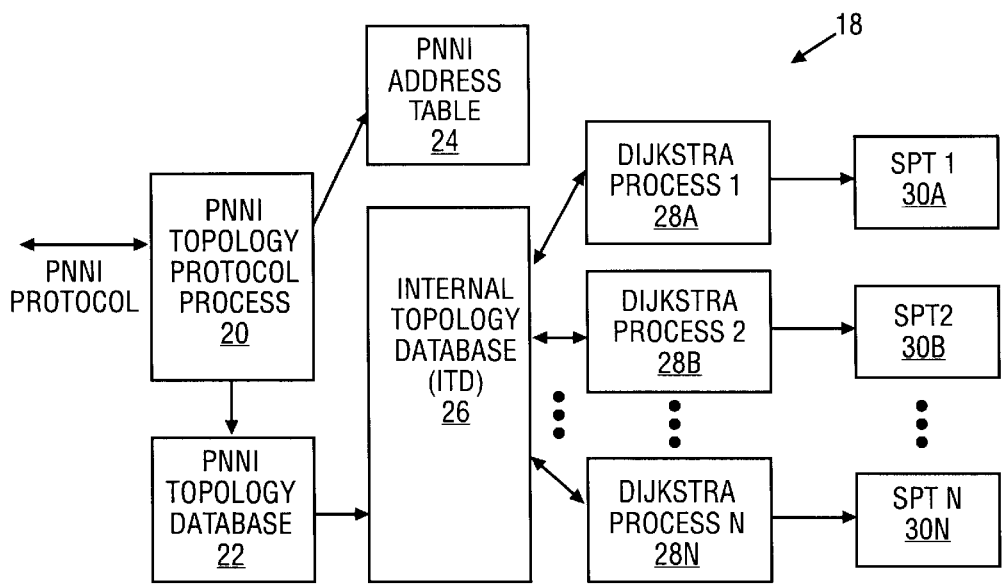
FIG. 2 illustrates a PNNI routing agent configured according to one embodiment of the present invention.

One exemplary embodiment of the PNNI routing agent 18 is shown in more detail in FIG. 2. As a result of the operation of the conventional PNNI topology protocol process 20, a PNNI topology database 22 is created and maintained at switch 12a (e.g., in memory). As indicated above, PNNI uses a reliable flooding mechanism to exchange topology information with other PNNI nodes (e.g., switches) in the same peer group. Thus, a PNNI topology or PTSE (PNNI topology state elements) database is maintained which stores the information received (and to be transmitted) during the flooding process. The PNNI topology database contains the topology information, along with all of the QoS-based traffic parameters that are associated with each link and node of the entire peer group as well as those fed down from higher levels in the network hierarchy. For this embodiment then, each PTSE in the topology database 22 is formatted to resemble a PNNI PTSE to make it more convenient for the flooding procedure.

Also as described above, each PNNI node has a default address. Additional addresses can be obtained via local and network management operations. These addresses are stored in a PNNI address table 24 and may also be used to originate associated PTSEs by the local node (e.g., switch 12a) and flooded to the peer group. The address table 24 thus stores all reachable addresses along with the node(s) via which they can be reached. Addresses so stored are used during a route search as discussed below.

An internal topology database (ITD) 26 is created for use as an input for the various Dijkstra processes 28a–28n. The Dijkstra processes 28a–28n are used to calculate the shortest path routes for the specified network constraints. There is a separate Dijkstra process 28 for each predefined constraint, and each Dijkstra process 28 will generate its own SPT 30. Thus, multiple SPTs 30a–30n are maintained as outputs from the Dijkstra processes 28a–28n, with all SPT 30a–30n optimized on a specified constraint (e.g., a delay- or cost-based constraint). Each SPT 30a–30n describes the shortest path from the local node (e.g., switch 12a) to all other nodes for its respective constraint.

Each Dijkstra process 28a–28n may be executed, and the corresponding SPT 30a–30n regenerated, upon a significant triggering event. Triggering events correspond to changes in the PNNI topology database 22, thus upon such events the associated SPT 30a–30n needs to be updated to reflect the change in network topology. Significant triggering events may include topology changes such as the addition or removal of a link or switch.

When a route request is received, the address table 24 is consulted to see if the destination node's address is present. If the destination node is found, it is noted and located in one or more of the associated SPTs 30a–30n, according to the requested bandwidth and other requirements. An SPT is chosen from among the available options (if more than one exists) and a DTL stack can then be derived by traversing the chosen SPT from the destination node to the source node. Such traversal is possible because the SPTs 30a–30n are organized as spanning trees and not as traditional linear tables. This structure is described in further detail below. Each SPT 30a–30n may maintain multiple equal-cost paths, if any, and a number of equal-cost paths may be considered per SPT. Paths are considered as equal cost if the difference between their accumulated values on a specific constraint is less than or equal to a specified tolerance range.

Notice then that the present routing scheme eschews the use of traditional routing tables. No routing tables are actually generated. Instead, routing tables exist only logically. The route search involves a lookup in the address table 24 first, followed by a read of the prealculated SPTs 30a–30n by tracing from destination node to local node. There is a significant amount of time and memory saved (e.g., compared to routing schemes of the past) by not generating traditional routing tables.

Figure 3:
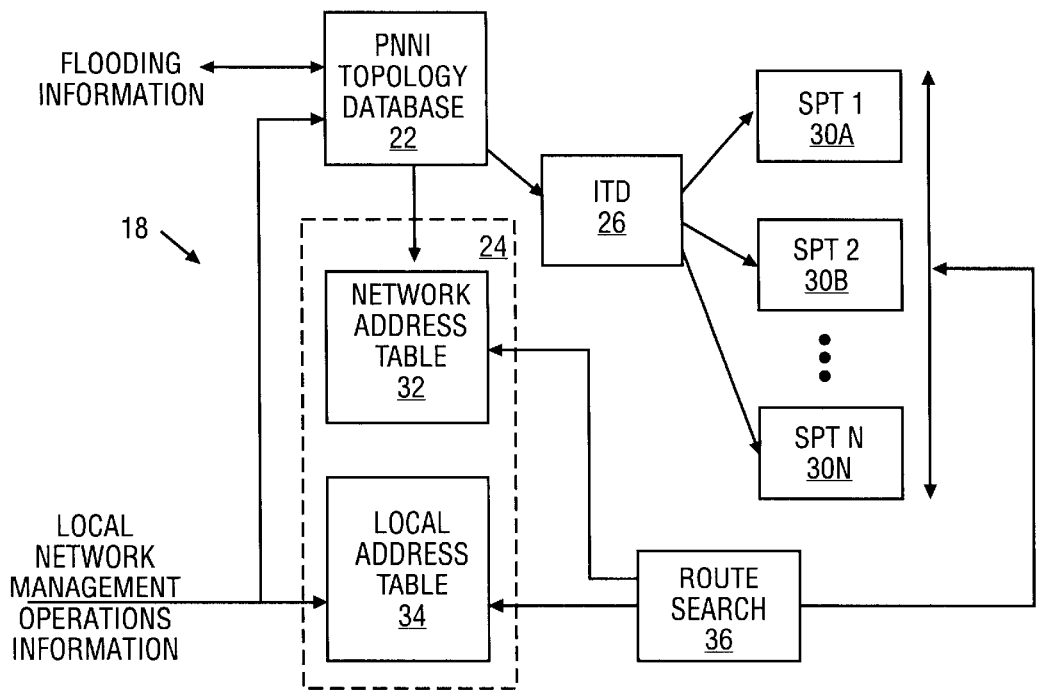
FIG. 3 illustrates a functional diagram for a PNNI routing agent's major data structures and interfaces according to one embodiment of the present invention.

FIG. 3 illustrates a functional diagram for PNNI routing agent 18 according to one embodiment of the present invention. PNNI topology database 22 is shown as being capable of receiving flooding information to allow for the exchange of topology information with other PNNI nodes in the same peer group. The address table 24 may be divided into a network address table 32 and a local address table 34. Locally obtained addresses are stored in the local address table 34 and, as indicated above, may also be used to originate associated PTSEs by the local node and flooded to the peer group. Addresses learned from the network are retrieved from the topology database 22 and stored in the network address table 32 for fast address searching during route searching. The local address table 34 may be used to route a local SVC call, i.e., local switching to a locally attached link or to forward a call from another node. For non-local switching calls, the network address table 32 is searched to find the destination node which advertises the associated address, and, if the destination node is found, one or mode SPTs 30a–30n may be searched using the route search routine 36 to find the path which meets the SVC call requirements to that destination node.

There are three scenarios for a route search. First, if the destination address finds a match in the local address table 34, the SVC call is forwarded to a local port at the source switch. Second, if there is a match in the network address table 34, the PNNI destination node is identified, a search in one or more of the SPTs 30a–30n is performed and, if a route is found, a DTL stack is constructed and the call is forwarded. Third, if no route is found, the call is blocked.

To more fully appreciate the present invention, it is helpful to understand the relationships between various topology metrics and attributes. It is these metrics and attributes which are collected and advertised by the PNNI routing protocol (e.g., during the flooding process referred to above) and which form constraints on links, nodes and paths within a network. Thus, it is these metrics and attributes which form the basis for routing path selection.

Table 1 below lists the correlation between service classes and traffic metrics/attributes. Notice that all the metrics/attributes may be specified on the basis of service classes. Where a metric/attribute is designated as "required", this means that the metric/attribute must be specified for the associated service class. "Optional" indicates that the metric/attribute may be specified for the associated service class, and "n/a" indicates that the metric/attribute is not applicable for the associated service class.

TABLE 1

| | service class | | | | |
|---|---|---|---|---|---|
| metric/attribute | CBR | rtVBR | nrtVBR | ABR | VBR |
| AW | required | required | required | required | required |
| maxCR | optional | optional | optional | required | required |
| AvCR | required | required | required | required | n/a |
| maxCTD | required | required | required | n/a | n/a |
| CDV | required | required | n/a | n/a | n/a |
| $CLR_0$ | required | required | required | n/a | n/a |
| $CLR_{0+1}$ | required | required | required | n/a | n/a |
| CRM | n/a | optional | optional | n/a | n/a |
| VF | n/a | optional | optional | n/a | n/a |

The traffic metrics/attributes are defined as follows:

Administrative weight (AW) is a value assigned to indicate the relative desirability of using a link or node. It is a dimensionless quantity. AW is additive and can be aggregated during path selection in the Dijkstra calculation. If set to 1 on every link, the accumulated value becomes a hop count. In some embodiments, there may be a single AW configured per interface for all service classes. In other embodiments, AW may be measured for one or more different service classes.

Cell delay variation (CDV) describes the variability in a pattern of cell arrival events observed at a measurement point. More specifically, CDV is the (1–a) quantile of the CTD, minus the fixed CTD that could be experienced by any delivered cell on a connection during the entire connection holding time, measured in microseconds. Note that, the ATM Forum defines CTD (cell transfer delay) as a measure of the elapsed time between a cell exit event (i.e., the time at which the first bit of an ATM cell has completed transmission out of an end-system or ATM network element to a public or private ATM network element across a UNI measurement point) at a first measurement point (e.g., a source UNI) and the corresponding cell entry event (i.e., the time at which the last bit of an ATM cell has completed transmission into an end-system or ATM network element from a public or private ATM network element across a UNI measurement point) at a second measurement point (e.g., a destination UNI) for a particular connection. Thus, the CTD between two measurement points is the sum of the total inter-ATM node transmission delay and the total ATM node processing delay between I the two measurement points. See, e.g., ATM Forum, *Traffic Management Specification* v4.0 (1996).

CDV is additive and can be accumulated during path selection in the Dijkstra calculation. In some embodiments, CDV may be statically configured on per-trunk basis, e.g., based on queuing delay. In such cases, one CDV value may be used for all supported service classes. In other embodiments, CDV may be a measured value, e.g., using OAM cells. In such cases, CDVs could be measured separately for different service classes, and these different values used in the shortest path computations.

For purposes of the present invention, maxCTD may be regarded as the sum of all fixed delay components across a link or node and CDV, measured in microseconds. The quantity is additive and can be accumulated during the Dijkstra calculation. In one embodiment, maxCTD may be statically configured on s per-trunk basis, e.g., based on distance traversed by a link. In other embodiments, maxCTD may be measured for one or more service classes and the resulting values used for the shortest path computations.

Maximum cell rate (maxCR) may be regarded as the maximum capacity usable by PNNI for SVCs belonging to the specified service category, measured in cells per second. In some embodiments, a single maxCR may be used for all service classes, however, in other embodiments, different values of maxCR may be used for different service classes.

Available cell rate (AvCR) is a measure of effective available capacity for CBR and VBR services and a measure of capacity available for minimum cell rate reservation, measured in cells per sec. A single AvCR may be used for all service classes or, alternatively, separate values may be used for different service classes.

Cell loss ratio ($CLR_0$) is the maximum cell loss ratio for $CLP_0$ traffic (i.e., cells with a CLP bit set to 0) over a link or node. In some embodiments, this value may be statically configured for all applicable service classes. In other embodiments, separate values may be used for different service classes.

Cell loss ratio ($CLR_{0+1}$) is the maximum cell loss ratio for $CLP_{0+1}$ traffic (i.e., cells with a CLP bit set to 1) over a link or node. In some embodiments, this value may be statically configured for all applicable service classes.

Cell rate margin (CRM) is a measure of the difference between the effective bandwidth allocation and the allocation for sustainable cell rates, in cells per second. Again, this may be a statically configured or a measured value.

Variation factor (VF) is a relative measure of the square of the cell rate margin normalized by the variance of the sum of the cell rates of all existing connections. In some embodiments, this value may be statically configured for all applicable service classes. In other embodiments, it may be measured for different service classes.

To summarize, the traffic metrics (AW, CDV and CTD) are additive and may be used for shortest path computations in a Dijkstra calculation when a QoS-based routing path, i.e., one which is optimized on a given traffic metric for a given class of service, is computed. The traffic attributes (maxCR, AvCR, CLR0, $CLR_{0+1}$, VF and CRM) are not additive and, therefor, are not used as optimization criteria for the Dijkstra calculations. In the present invention then, a routing table is a combined set of DTLs, where each DTL describes an optimal routing path from the calculating node (i.e., the node where the table is computed) to a given destination node. More particularly, the present invention makes use of two strategies for route calculation (i.e., for creation of the SPTs 30a–30n): cost-based or delay-based. If cost-based routing is used, the SPT's constraint is AW, if delay-based routing is used, the SPT's constraint is CTD or CDV.

For the illustrated embodiment then, the Dijkstra algorithm is used to pre-calculate routes from the local node to each reachable destination node. In some cases each SPT 30a–30n may be created using a single Dijkstra process 28 optimized to a specified constraint. Alternatively, a set of Dijkstra processes 28a–28n may be used to create SPTs 30a–30n for each specified constraint. The input for the Dijkstra processes 28a–28n is the PNNI topology database, which, in order to benefit execution speed, may be reformatted to a separate memory space as ITD 26. The individual constraints used by each Dijkstra process 28a–28n are configurable parameters.

In one embodiment, the output of each Dijkstra calculation is an SPT with its root at the local node and branches spanning outward towards all other nodes. Each SPT may accommodate multiple paths to the same destination. A configurable tolerance value for the accumulated cost is used by the Dijkstra calculation. Paths are considered equal-cost if the difference between their accumulated values are within the tolerance. All (or some) equal-cost paths are maintained in a single SPT. The equal-cost tolerance is configurable on a per node basis. The setting of this value will control the number of alternate routes contained in each SPT 30a–30n. A small value will result in fewer alternate routes than a large value. In this way, a network administrator can trade off setup time and SPT size with the ability to balance loads across paths with similar QoS characteristics.

Figure 4:
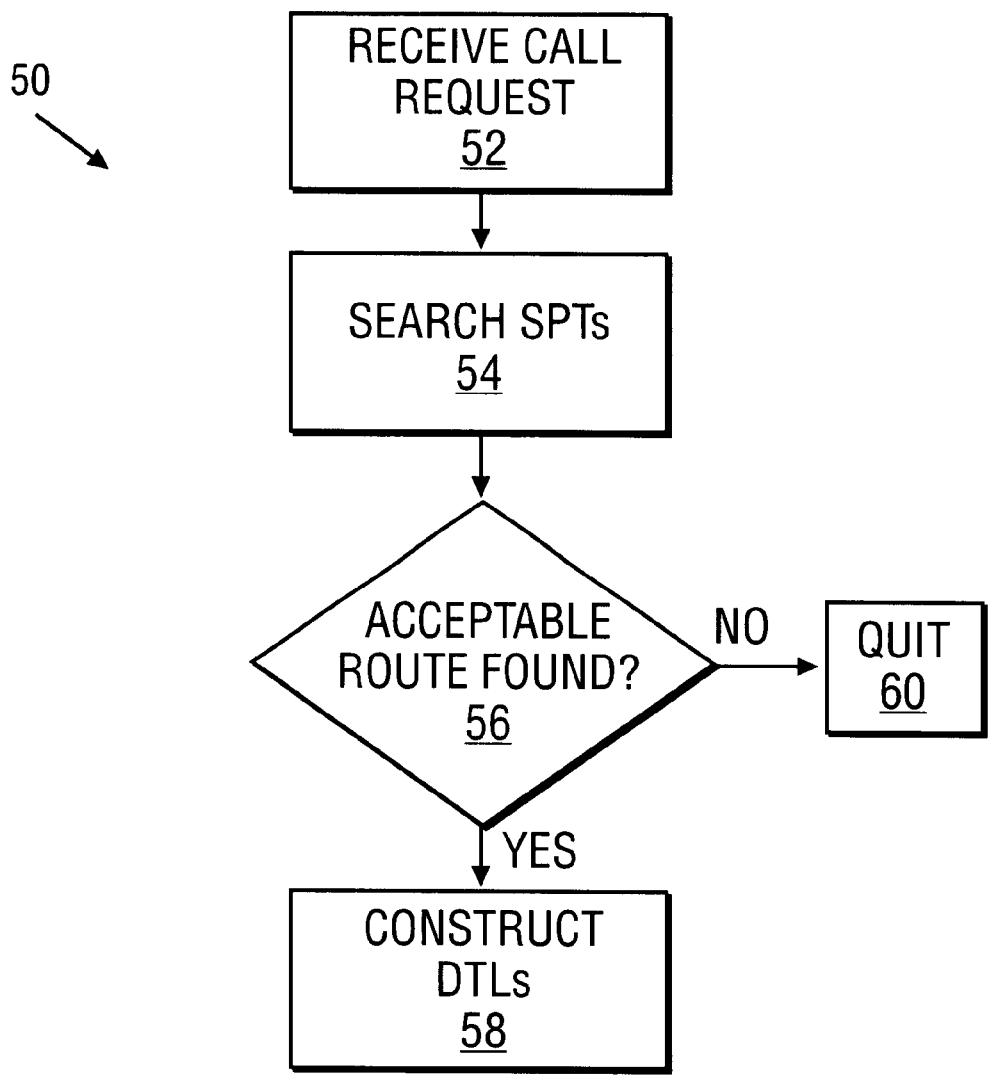
FIG. 4 illustrates a process for routing a connection within a network in accordance with one embodiment of the present invention.

FIG. 4 now illustrates a process 50 for selecting a route for a connection in accordance with one embodiment of the present invention. When a call processing entity requests a route, step 52, the route search algorithm.36 searches each SPT 30a–30n to locate an acceptable route, step 54. If an acceptable route to the destination node is found, step 56, the DTLs are constructed to configure the selected path, step 58. If no acceptable route to the destination node is found, step 60, the process quits and the call request is blocked.

As indicated above, within an SPT, a selection of alternate equal-cost paths may be provided. This makes it posssible to share loads between paths with equal cost. When an SPT provides multiple equal-cost paths determined by the equal-cost tolerance parameter, a path may be chosen from the selection at random. A random choice is used because, in the absence of valid link state information, which is the case when many connections are being routed over the same path in a short time, a random choice has been found to distribute the load better than a choice based on stale link state information. Of course, other equal-cost path selection processes could be used.

As indicated above, each SPT 30a–30n is organized as a spanning tree. By this is meant that each SPT is arranged as a graphical representation of the inter-nodal paths within the network. Such a representation is constructed from the network topology (e.g., as stored in PNNI topology database 22) as follows.

Figure 5:
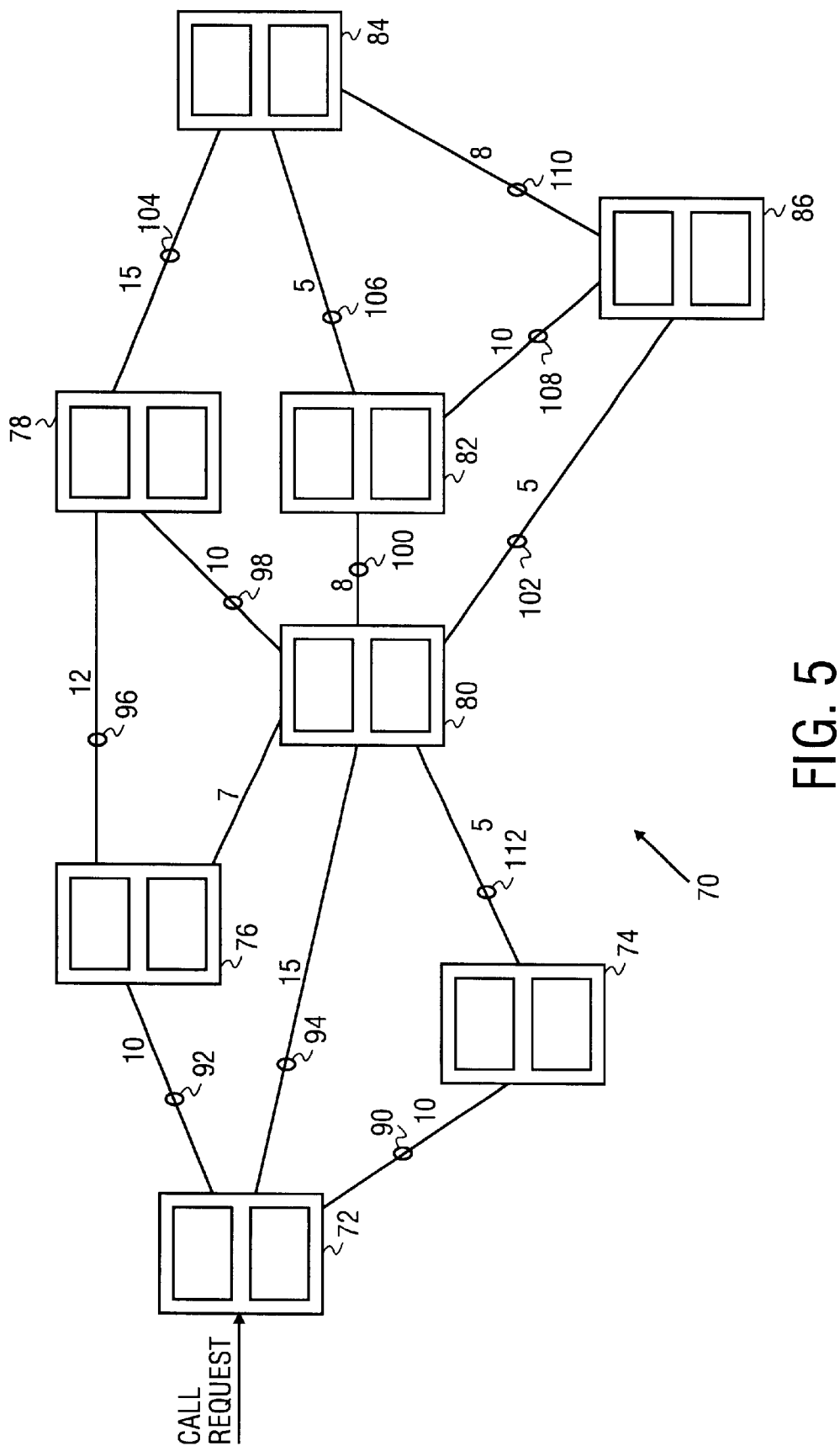
FIG. 5 illustrates a network which may employ a routing table structure generated in accordance with one embodiment of the present invention.

Consider the network 70 shown in FIG. 5. Network 70 is made up of switches 72, 74, 76, 78, 80, 82, 84, and 86. The switches are interconnected by links 90, 92, 94, 96, 98, 100, 102, 104, 106, 108, 110 and 112. Each link has an associated "cost" identified by the number written adjacent to the link. For example, link 90 which connects switches 72 and 74 has a cost of 10; link 100 which connects switches 80 and 82 has a cost of 8; and so on. As used in this example, the term "cost" traffic parameter which may be used as an optimizing constraint by the Dijkstra processes 28a–28n. For example, cost may refer to a delay-based penalty paid for traversing the associated link. The interconnections of the switches of FIG. 5 and their associated costs are presented below Table 2.

TABLE 2

| Link | Connecting Switches | Cost |
|------|---------------------|------|
| 90   | 72, 74              | 10   |
| 92   | 72, 76              | 10   |
| 94   | 72, 80              | 15   |
| 96   | 76, 78              | 12   |
| 98   | 80, 78              | 10   |
| 100  | 80, 82              | 8    |
| 102  | 80, 86              | 5    |
| 104  | 78, 84              | 15   |
| 106  | 82, 84              | 5    |
| 108  | 82, 86              | 10   |
| 110  | 84, 86              | 8    |
| 112  | 74, 80              | 5    |

Now assume that switch 72 is the calculating node. That is, a call request is received at switch 72 and switch 72 must determine whether a route exists within network 70 which can satisfy the call request. A call request is associated with a specified service category and a set of QoS parameters. Based on the circumstances of the call request, one or more pre-computed routing tables will be searched in order to find a satisfactory and optimal routing path (indicated by a DTL) for the call request.

The use of pre-computed routing tables tends to speed up (e.g., over on-demand routing schemes) the call processing at the calculating node (i.e., the node operating on switch 72). As indicated, each table contains a set of DTLs which lead to all the other nodes of the network. The routing paths contained in a given routing table are optimized on a single additive traffic metric and for a given service category. Note, sometimes a single table contains paths which are optimized for multiple service categories, for example where all the traffic parameters are the same for the associated service categories. In such cases, the number of required routing tables can be reduced.

Figure 6:
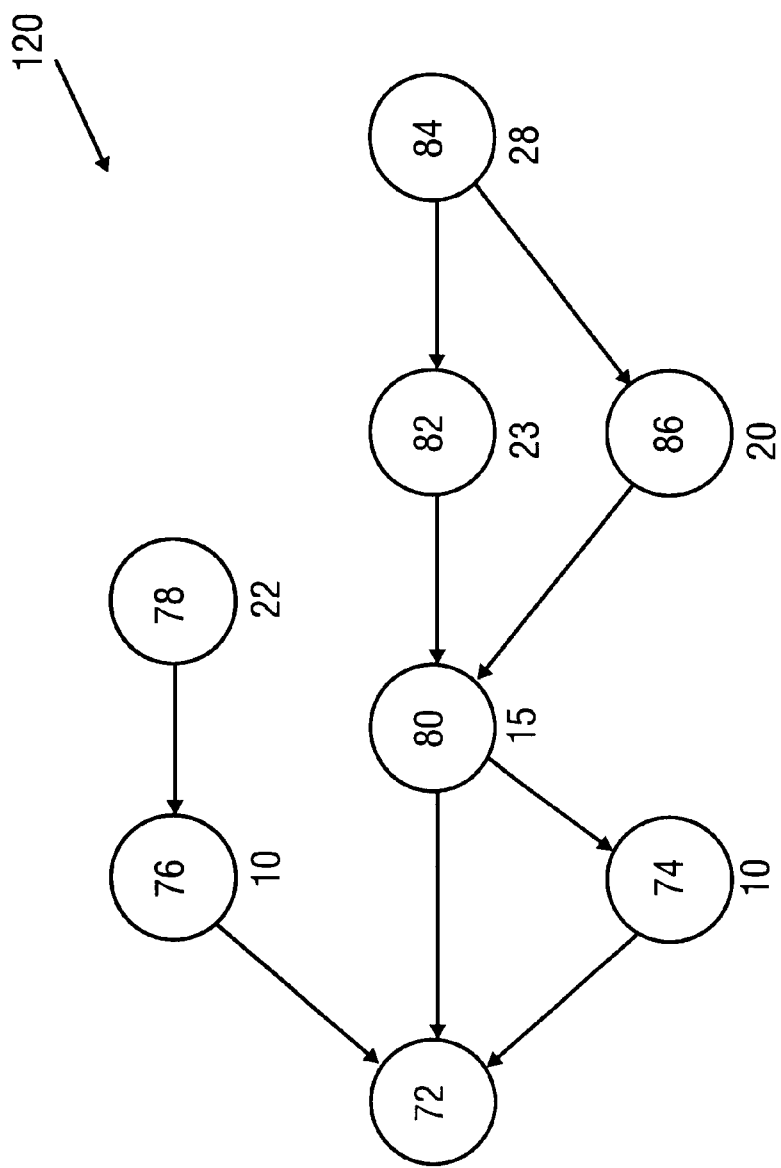
FIG. 6 illustrates a shortest path tree for the network of FIG. 5, organized as a pseudo-spanning tree in accordance with an embodiment of the present invention.

Now, with reference to FIG. 6, assume that SPT 120 is a pre-computed routing table generated by switch 72, optimized on a specified traffic parameter represented by "cost", for a given service category. SPT 120 is a computer-generated (e.g., using a Dijkstra process) graphical representation of the inter-nodal paths (i.e., inter-switch paths) of network 70, optimized to the cost parameter. As shown, the graphical representation is organized as a tree structure, with switch 72 represented as the root node of the tree. Switch 72 is the root node because it is the calculating node. All other reachable destination nodes of network 70 are represented by nodes if the tree structure and may be represented by branch nodes or leaf nodes. Leaf nodes are characterized as nodes without children but having one or more parent nodes. For example, based on the shortest path routes computed for network 70, switches 78 and 84 are represented by leaf nodes in SPT 120. Branch modes are characterized by having at least one parent and one child node. For example, in SPT 120, switches 74, 76, 80, 82 and 86 are represented by branch nodes. Node 76 is the parent node of node 78 and mode 78 is the child node of node 76 in the graphical representation. Similar relationships can be seen for the other notes. Notice that as the root node, switch 72 has no parent nodes in the graphical representation. The various nodes are connected by the least-cost (i.e., shortest path) links available from network 70. Where a child node has two or more parent nodes, this is an indication that two or more equal-cost paths exist within network 70 from switch 72 to the switch represented by that child mode.

Thus, the graphical representation of network 70 which comprises SPT 120 is created so that each of the least-cost (as determined by the "cost" parameters of the links of the network 70) is represented for each reachable destination node. Notice also that the aggregate cost (or additive cost in terms of the Dijkstra calculation) for a given node is reported. For example, SPT 120 illustrates that the cost to reach the node representing switch 74 from switch 72 is 10 cost units. Similar aggregate values for the node of network 70 are given below in Table 3. These values were obtained by computing the least-cost paths to the nodes from FIG. 5.

TABLE 3

| Node | Aggregate Cost |
|------|----------------|
| 74 | 10 |
| 76 | 10 |
| 78 | 22 |

TABLE 3-continued

| Node | Aggregate Cost |
|------|----------------|
| 80 | 15 |
| 82 | 23 |
| 84 | 28 |
| 86 | 20 |

To illustrate the computation process (and the associated link pruning process) refer again to FIG. 5. For a call request received at switch 72 to be routed to switch 78, multiple paths exist. For example, the call could be routed via link 90 to switch 74, then via link 112 to switch 80 and finally via link 98 to switch 78. However, the "cost" of this path would be 10+5+10=25 cost units. An alternative path, and indeed the shortest (i.e., least-cost) path as represented by SPT 120 would first route the call from switch 72 to switch 76 via link 92 and then via link 96 to switch 78. As shown in Table 2, this path has an aggregate cost of only 22 cost units (10+12) and is the shortest (i.e., least-cost) path within network 70 between switches 72 and 76. It is the function of the Dijkstra processes 28a–28n to determine these shortest path routes for a specified constraint (e.g., such as the cost parameter used in the above example). Only these shortest paths will comprise the graphical representations of the SPTs.

Those familiar with tree structure will recognize that SPT 120 is a directed tree. That is, paths are directed from the destination nodes to the root node. Further, the tree may be weighted so that although the Dijkstra process is only able to optimize on a single constraint (e.g., the "cost" parameter), associated parameters for each of the shortest path routes of SPT 120 may be maintained in a related data structure (or, indeed in the same data structure). This would allow for comparing other parameters of the call request (e.g., bandwidth) with the available shortest paths to determine whether the shortest path can truly satisfy the call request. In this way, appropriate routes may be selected.

Although the example above assumed that only one link exists between each switch of network 70, real-world networks often provide multiple links between switches and other nodes. For example, redundant links between switches may be provided to guard against network failures in the event a link is damaged or destroyed. The graphical representation for SPT 120 may accommodate an arbitrary number of alternative links between any two nodes to adapt to such networks.

Upon receipt of a call request then, address table 24 is consulted and, if the destination node identified in the call request is located, the SPT 120 may be accessed (e.g., using a pointer from an SPT node table into the graphical representation). The shortest path route may be traced back to the source node from the destination node, following parameters evaluated to determine if the route will satisfy the call request.

Thus, a routing table structure which provides quality of service sensitive routes pre-computed in a shortest path tree organized as a spanning tree has been described. As discussed above, in an exemplary embodiment, the present invention computes, routes for a cell or packet switched network by first selecting an optimization function or constraint for a shortest path computation, and then computing available routes (in the form of SPTs) using the selected optimization function or constraint. These results can then be searched upon receipt of a call request and, if available, a pre-computed route provided therefrom. The SPTs are organized as graphical representations of the shortest path routes within the network, as discussed above. Although discussed with reference to specific illustrated embodiments, the generality of present invention should not be limited thereby. Instead, the present invention should only be measured in terms of the claims which follow.

What is claimed is:

1. A computer network routing structure comprising, a shortest path tree organized as a pseudo-spanning tree, that provides a plurality of source-computed routes within a computer network, each source computed route optimized to a plurality of specified constraints for a specified network service category, the plurality of source computed routes provided in a single routing table structure, such that the pseudo-spanning tree traverses from a destination node, specified in a call request, to a calculating node, the call request associated with a specified service request and set of service parameters.

2. The computer network routing structure of claim 1 wherein each of the plurality of source-computed routes comprise designated transit lists (DTLs).

3. The computer network routing structure of claim 2 wherein the plurality of source-computed routes comprise alternate routes between a plurality of nodes of the network.

4. The computer network routing structure of claim 2 further comprising network traffic parameters other than the plurality of specified constraints for associated links and nodes of the computer network.

5. The computer network routing structure of claim 1 comprising a computer-generated shortest path tree that provides a plurality of inter-nodal paths in a computer network, each inter-nodal path optimized to a plurality of specified constraints.

6. The computer network routing structure of claim 1 wherein the pseudo-spanning tree comprises a tree structure including a root node, branch nodes and leaf nodes, the leaf nodes being characterized by having at least one parent node and no child nodes, the branch nodes being characterized by having at least one parent node and at least one child node which may be a leaf node or a branch node, and the root node being characterized by having no parent nodes, the root node, branch nodes and leaf nodes being connected by one or more links of the computer network.

7. The computer network routing structure of claim 6 wherein a child node having two or more parent nodes denotes two equal cost paths within the computer network to reach the node of the computer network represented thereby.

8. A method comprising:
   generating a shortest path tree that acts as a computer network routing structure, organized as a pseudo-spanning tree, to provide a plurality of inter-nodal paths in a computer network, each inter-nodal path optimized to a plurality of specified constraints, such that the pseudo-spanning tree traverses from a destination node, specified in a call request, to a calculating node, the call request associated with a specified service request and set of service parameters; and
   providing the one or more inter-nodal paths in a single routing table structure.

9. The method of claim 8 further comprising selecting the constraints prior to generating the shortest path tree.

10. The method of claim 9 wherein one of the constraints is an additive ATM traffic metric.

11. The method of claim 10 wherein each of the constraints comprises cell delay variation (CDV).

12. The method of claim 10 wherein one of the constraints comprises a function of the relative desirability of using a link or node within the computer network.

13. The method of claim 10 wherein one of the constraints comprises cell transfer delay (CTD).

14. The method of claim 9 further comprising selecting one of the paths in response to a request for a connection within the computer network.

15. The method of claim 14 wherein selecting one of the paths comprises tracing the inter-nodal paths from destination node to local node.

16. The method of claim 15 wherein the destination node is identified from information contained in the request for a connection.

17. The method of claim 16 wherein the destination node is selected from the graphical representation using an index pointer from a table accessed using the information to identify the destination node.

18. The method of claim 8 wherein the shortest path tree is generated using a Dijkstra procedure.

19. The method of claim 18 wherein one of the specified constraints comprises an ATM traffic parameter.

20. The method of claim 19 wherein the shortest path tree includes ATM traffic parameters other than the plurality of specified constraints on each inter-nodal path included in the pseudo-spanning tree.

21. The method of claim 8 wherein the graphical representation is generated so as to include an arbitrary number of paths between any two nodes of the computer network.

22. The computer network routing structure of claim 6 wherein traversal of the tree is restricted to a path from a child node to a parent node of the child node.

23. A machine-readable medium that provides executable instructions, which when executed by a processing system, cause the processing system to perform a method, the method comprising:
   generating a shortest path tree that acts as a computer network routing structure, organized as a pseudo-spanning tree, to provide a plurality of inter-nodal paths in a computer network, each inter-nodal path optimized to a plurality of specified constraints, such that the pseudo-spanning tree traverses from a destination node, specified in a call request, to a calculating node, the call request associated with a specified service request and set of service parameters; and
   providing the one or more inter-nodal paths in a single routing table structure.

24. The machine readable medium of claim 23 further comprising selecting the constraint prior to generating the shortest path tree.

25. The machine readable medium of claim 24 wherein one of the constraints is an additive ATM traffic metric.

26. The machine readable medium of claim 25 wherein one of the constraints comprises cell delay variation (CDV).

27. The machine readable medium of claim 25 wherein one of the constraints comprises a function of the relative desirability of using a link or node within the computer network.

28. The machine readable medium of claim 25 wherein one of the constraints comprises cell transfer delay (CTD).

29. The machine readable medium of claim 24 further comprising selecting one of the paths in response to a request for a connection within the computer network.

30. The machine readable medium of claim 29 wherein selecting one of the paths comprises tracing the inter-nodal paths from destination node to local node.

31. The machine readable medium of claim 30 wherein the destination node is identified from information contained in the request for a connection.

32. The machine readable medium of claim 31 wherein the destination node is selected from the graphical representation using an index pointer from a table accessed using the information to identify the destination node.

33. The machine readable medium of claim 23 wherein the shortest path tree is generated using a Dijkstra procedure.

34. The machine readable medium of claim 33 wherein one of the specified constraints comprises an ATM traffic parameter.

35. The machine readable medium of claim 34 wherein the shortest path includes ATM traffic parameters other than the plurality of specified constraints on each inter-nodal path included in the pseudo-spanning tree.

36. The machine readable medium of claim 23 wherein the graphical representation is generated so as to include an arbitrary number of paths between any two nodes of the computer network.

37. An apparatus comprising:
    means for generating a shortest path tree that acts as a computer network routing structure, organized as a pseudo-spanning tree, to provide a plurality of inter-nodal paths in a computer network, each inter-nodal path optimized to a plurality of specified constraints, such that the pseudo-spanning tree traverses from a destination node, specified in a call request, to a calculating node, the call request associated with a specified service request and set of service parameters; and
    means for providing the one or more inter-nodal paths in a single routing table structure.

38. The apparatus of claim 37 further comprising selecting the constraints prior to generating the shortest path tree.

39. The apparatus of claim 38 wherein one of the constraints is an additive ATM traffic metric.

40. The apparatus of claim 39 wherein one of the constraints comprises cell delay variation (CDV).

41. The apparatus of claim 39 wherein one of the constraints comprises a function of the relative desirability of using a link or node within the computer network.

42. The apparatus of claim 39 wherein one of the constraints comprises cell transfer delay (CTD).

43. The apparatus of claim 38 further comprising selecting one of the paths in response to a request for a connection within the computer network.

44. The apparatus of claim 43 wherein selecting one of the paths comprises tracing the inter-nodal paths from destination node to local node.

45. The apparatus of claim 44 wherein the destination node is identified from information contained in the request for a connection.

46. The apparatus of claim 45 wherein the destination node is selected from the graphical representation using an index pointer from a table accessed using the information to identify the destination node.

47. The apparatus of claim 37 wherein the shortest path tree is generated using a Dijkstra procedure.

48. The apparatus of claim 47 wherein one of the specified constraints comprises an ATM traffic parameter.

49. The apparatus of claim 48 wherein the shortest path includes ATM traffic parameters other than the plurality of the specified constraints on each inter-nodal path included in the pseudo-spanning tree.

50. The apparatus of claim 37 wherein the graphical representation is generated so as to include an arbitrary number of paths between any two nodes of the computer network.

* * * * *